Aug. 17, 1926.   G. W. PLUME   1,596,118
HOLDER
Filed June 5, 1923   2 Sheets-Sheet 1
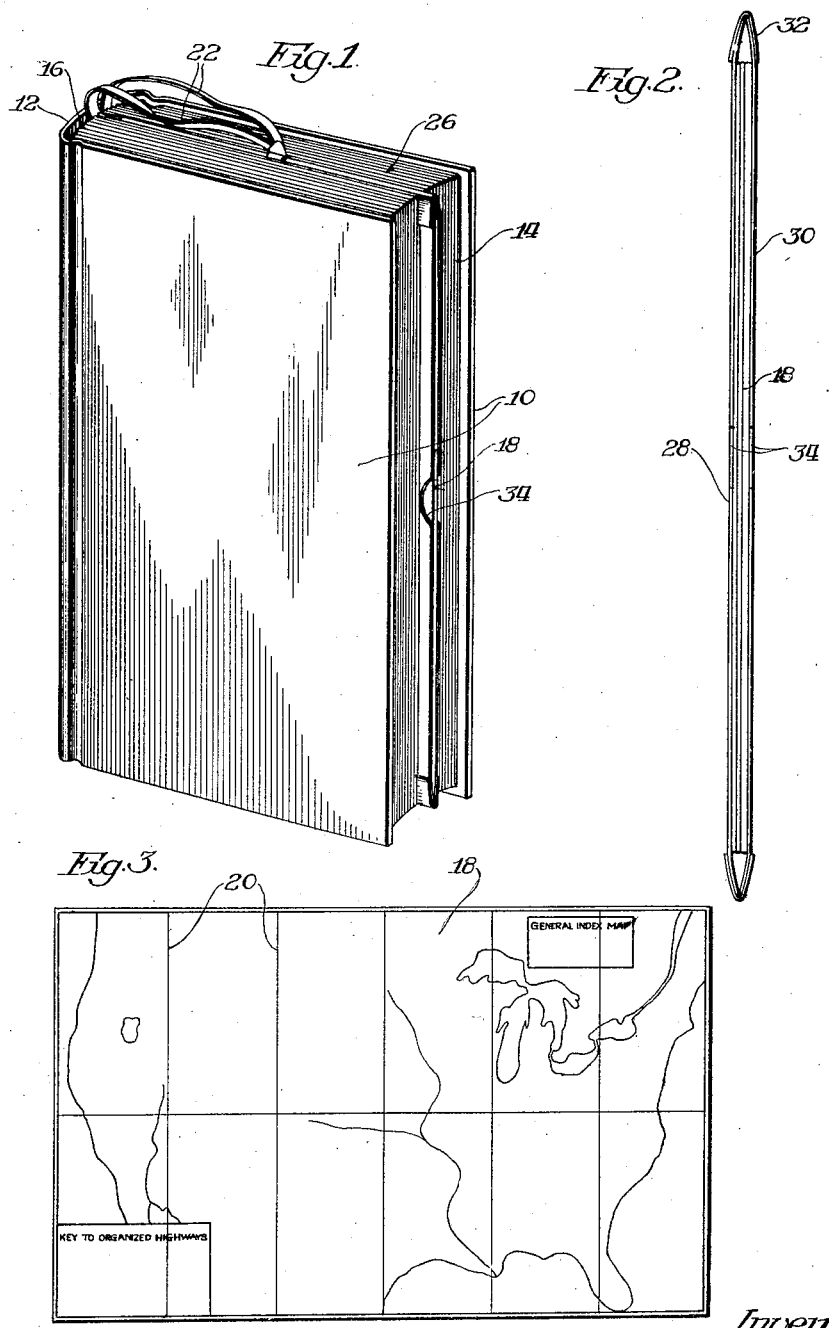
Inventor.
Gifford W. Plume.
By Brown Boettcher Dienner
Atty Aug. 17, 1926.
G. W. PLUME
HOLDER
Filed June 5, 1923  2 Sheets-Sheet 2
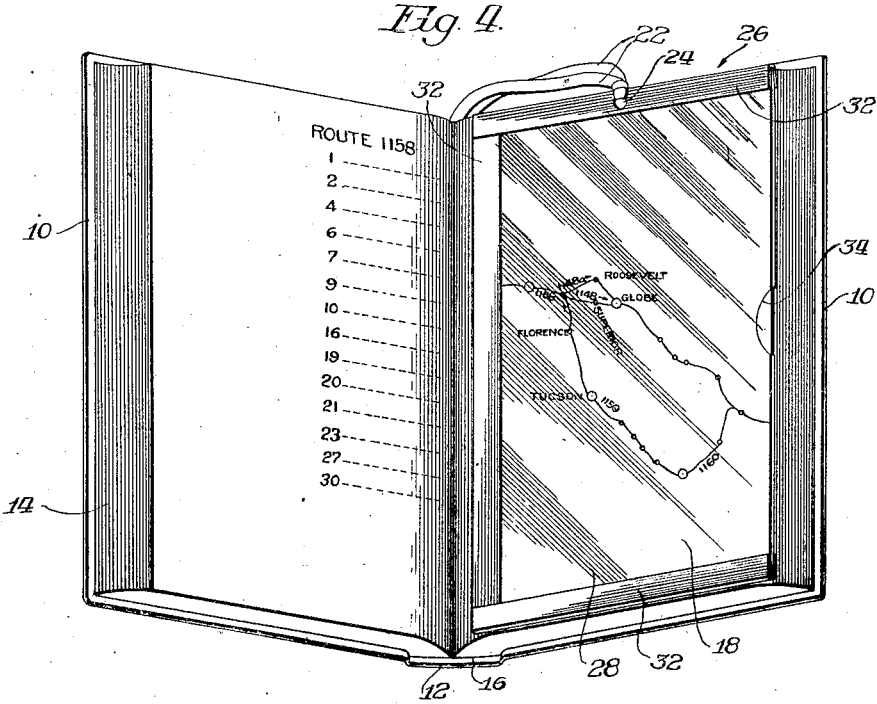
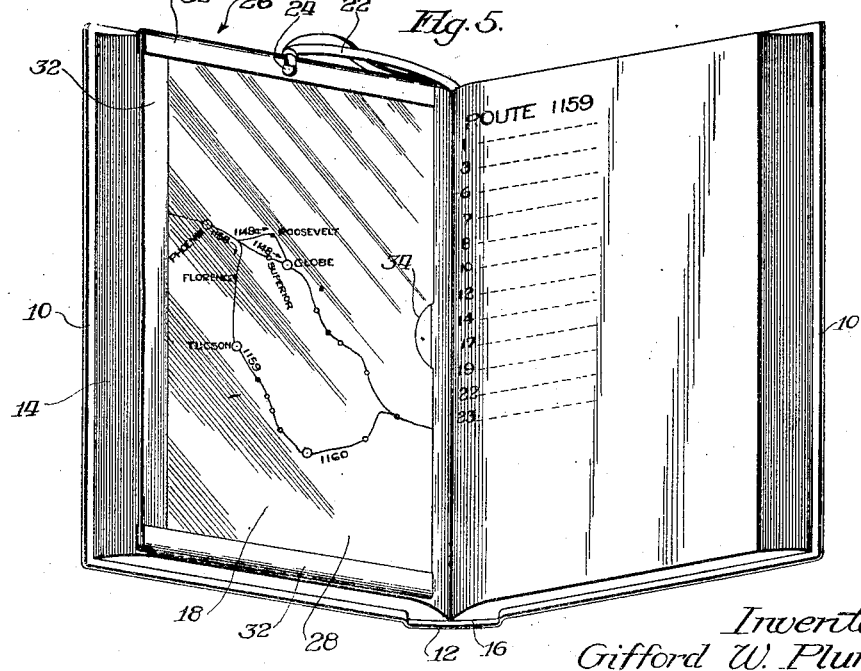
Inventor
Gifford W. Plume
By Brown Boettcher Dienner
Atty Patented Aug. 17, 1926.

1,596,118

UNITED STATES PATENT OFFICE.

GIFFORD W. PLUME, OF CHICAGO, ILLINOIS, ASSIGNOR TO AUTOMOBILE BLUE BOOKS, INC., OF CHICAGO, ILLINOIS, A CORPORATION OF ILLINOIS.

HOLDER.

Application filed June 5, 1923. Serial No. 643,544.

My invention relates to guide books for the use of tourists, and more specifically to an improved holder for the convenience of the tourist in the use of such a guide book.

The detailed route instructions, commonly given in such guide books are an effective means of keeping the tourist on the right road, but when traveling with such instructions and without simultaneous recourse to a suitable map, there is apt to be a more or less "lost" sensation, and it is also difficult for the user to maintain a comprehensive idea of the situation in which he finds himself. It is entirely impracticable to duplicate the map of each route on the same page with it or the opposite page, as that would swell the volume to unheard of dimensions. In the past, the maps have either been printed separately, or they have been printed all in a group at the beginning or end of the book.

With the maps printed in the books, the user either gets along without the map, or turns the pages between the map and the route instructions over and back repeatedly, wearing out his temper and wrists as well as the book. Furthermore, the necessity of memorizing a bit of information from the map, referring to the route instructions, and repeating the process until an understanding of the possibilities of the situation is slowly and painfully built up, is a process rarely practiced on the road. It is customary to decide on the entire day's run when starting out in the morning, and avoid any changes during the day if possible.

The detached map has heretofore been even less available while on the road than the pages printed in the book, as it is always getting lost, or torn by the wind when an attempt is made to consult it while driving.

In the accompanying drawings:—

Figure 1 is a perspective view of a guide book and holder according to my invention;

Fig. 2 is an edge view of the open edge of the holder;

Fig. 3 shows a map; and

Figs. 4 and 5 are perspectives of the book and holder in use.

In the embodiment of the invention selected for illustration, the book is of the usual type, comprising a bound volume with covers 10 and back 12, the leaves 14 being bound by the usual binding at 16.

The map 18 is folded along fold lines 20 and when folded is preferably of dimensions not greater than those of the pages of the book. The map illustrated is subdivided into twelve parts to accomplish this. A ribbon 22 attached at one end to the binding of the book is tied at its other end through of the eyelet 24 in an envelope designated as an entirety by reference character 26. This envelope has one transparent side wall 28. The other side wall 30 may be transparent or not, as desired. These side walls are united around three edges by suitable binding strips 32 and notched at 34 in the middle of their free edges to facilitate removing the map from the pocket.

In touring with my improved holder, the map is first folded to expose that section of country across which the tourist is passing, and then placed in the envelope, the envelope being thereafter used as a book mark to mark the place where the route instructions are to be found. When actually traveling along the road, it may either be held open in the lap as in Figures 4 and 5, or closed as in Figure 1, to be opened to the right place at a moment's notice with the map positioned close beside the route instructions. When route 1158 from Phoenix to Tucson has been traveled, the envelope is merely turned with its open edge toward the back of the book, and the book will open as in Figure 5 to expose the same map section and the route instructions for route 1159.

Suppose now that in traveling out of Phoenix on route 1158, and approaching the point where that route leaves 1148 to Globe, the weather becomes threatening. The showing visible at a single glance in Figure 5 indicates immediately that if it is a question of immediate shelter, it is immaterial which route is followed, as the nearest shelter on one route would be Florence, and on the other Superior. On the other hand, if the approaching disturbance appears to be a cloud-burst, and it is probable that the roads will be almost impassable after the storm, Globe is substantially half as far away as Tucson, either of which places afford suitable accommodations for stopping over night. All this reasoning could have been worked out without the map, but only at an expenditure of about three times as much mental energy, remembering route numbers, page numbers, and names of places, as well as considerable activity opening the book in different places. With the device illustrated, all the information is presented to the eye at once, and there is nothing to do but look and think. In the first instance, the driver would in many cases get so far along on the road to Florence by the time the person using the book had concluded that it would be better to go to Globe, that no change of route would be made; whereas with the structure illustrated, it need only be a second or two before the holder of the blue book will remark that Globe is only half as far away as Tucson, and that the impending storm will probably make the roads hard to travel for the rest of the day.

Without further elaboration, the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claim.

I claim:—

In combination, a guide book describing routes, an envelope comprising a pair of side walls, one of which is transparent, means for securing the upper, lower, and back edges of said side walls together, an eyelet through the upper edges of said side walls, a folded map in said envelope showing the routes described by said book, the portion of said map which is to be used in conjunction with a route described by said guide book being visible through the transparent side of said envelope, and a flexible ribbon extending through said eyelet and permanently connecting said envelope to said guide book.

In witness whereof, I hereunto subscribe my name this 31 day of May, 1923.

GIFFORD W. PLUME.